United States Patent [19]

Moisin et al.

[11] Patent Number: 5,138,233
[45] Date of Patent: Aug. 11, 1992

[54] DRIVER CIRCUIT FOR A PLURALITY OF GAS DISCHARGE LAMPS

[75] Inventors: Mihail S. Moisin, Lake Forest; Andrew Bobel, Des Plaines, both of Ill.

[73] Assignee: Motorola, Inc., Schaumburg, Ill.

[21] Appl. No.: 753,496

[22] Filed: Sep. 3, 1991

Related U.S. Application Data

[63] Continuation-in-part of Ser. No. 665,825, Mar. 7, 1991, abandoned.

[51] Int. Cl.$^5$ ............ H05B 37/00; H05B 39/04; H05B 41/36
[52] U.S. Cl. .................... 315/187; 315/210; 315/239; 315/244; 315/276; 315/312; 315/DIG. 5; 315/DIG. 7
[58] Field of Search .......... 315/185 R, 187, 210, 315/239, 244, 276, 312, 323, 324, DIG. 5, DIG. 7

[56] References Cited

U.S. PATENT DOCUMENTS

| | | | |
|---|---|---|---|
| 4,286,194 | 8/1981 | Sherman | 315/187 |
| 4,370,600 | 1/1983 | Zansky | 315/209 R |
| 4,723,098 | 2/1988 | Grubbs | 315/DIG. 7 |
| 4,763,239 | 8/1988 | Ball | 315/244 |
| 5,013,970 | 5/1991 | Crawford | 315/187 |

FOREIGN PATENT DOCUMENTS

| | | | |
|---|---|---|---|
| 42-666 | 4/1977 | Japan | 315/324 |
| 42-670 | 4/1977 | Japan | 315/324 |

Primary Examiner—Eugene R. LaRoche
Assistant Examiner—Michael B. Shingleton
Attorney, Agent, or Firm—Peter D. Hudson

[57] ABSTRACT

A circuit (500) for driving two or more series-connected gas discharge lamps, having: an oscillator (518, 520, 522); and a transformer (524) with a primary winding (526) and a secondary winding (528). The transformer secondary winding has first (129A) and second (129B) points connected respectively to first (508) and second (514) output terminals across the series-connected lamps. A capacitor (532) couples the first point of the transformer secondary winding to an intermediate output terminal (112). The voltage produced by the secondary winding thus drives the lamps in series, while the pre-strike voltage produced across the secondary winding is applied across a single lamp (106) to cause it to strike. After striking, current to the intermediate output terminal (512) is limited by the capacitor (532). In this way, the voltage which needs to be produced across the secondary winding to ensure striking of all of the lamps is reduced. In alternative circuits the output terminals across the lamps may be connected to points on the secondary winding further apart than the first and second points (FIG. 6) or intermediate the first and second points (FIGS. 1-4).

20 Claims, 6 Drawing Sheets

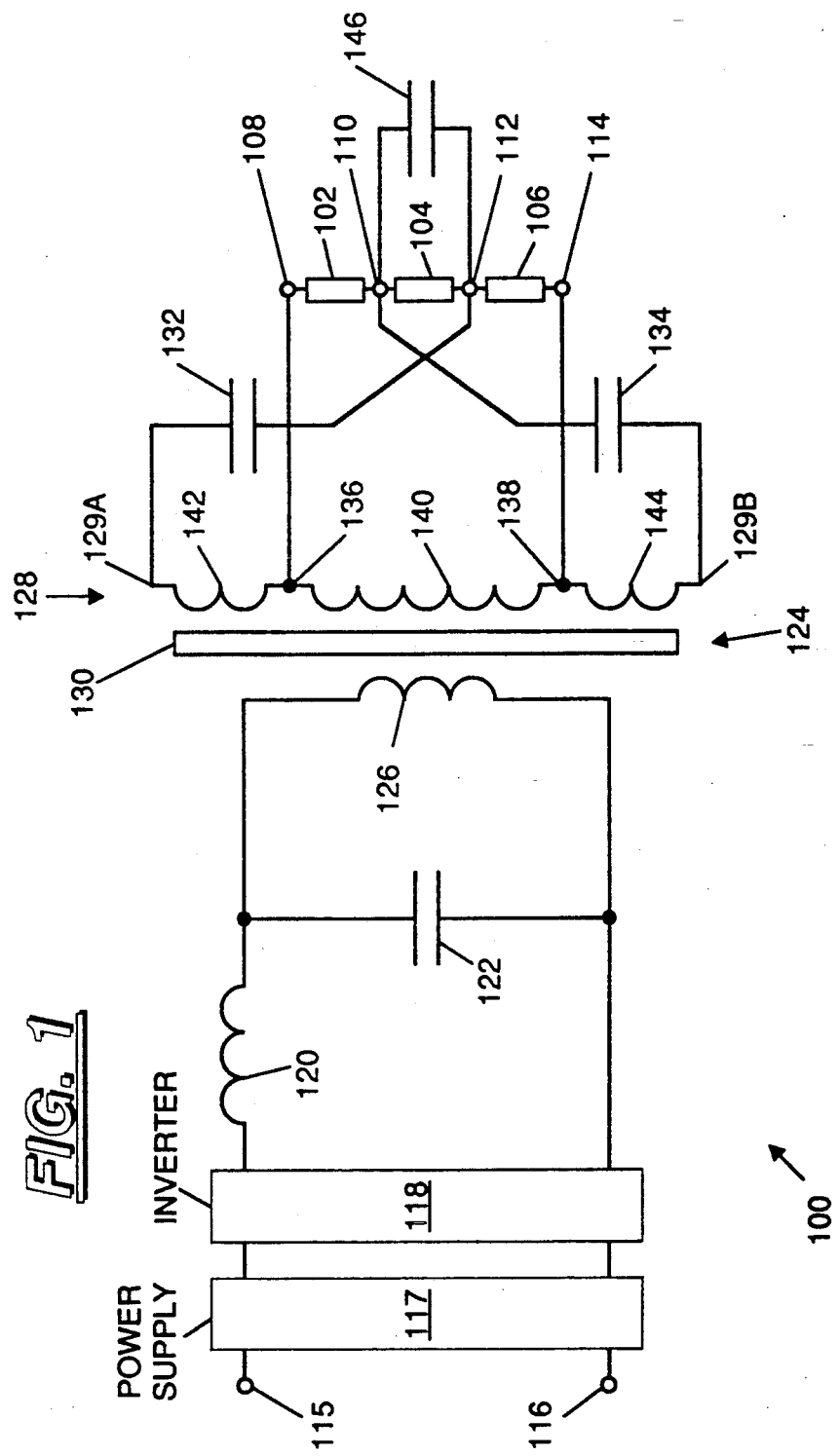

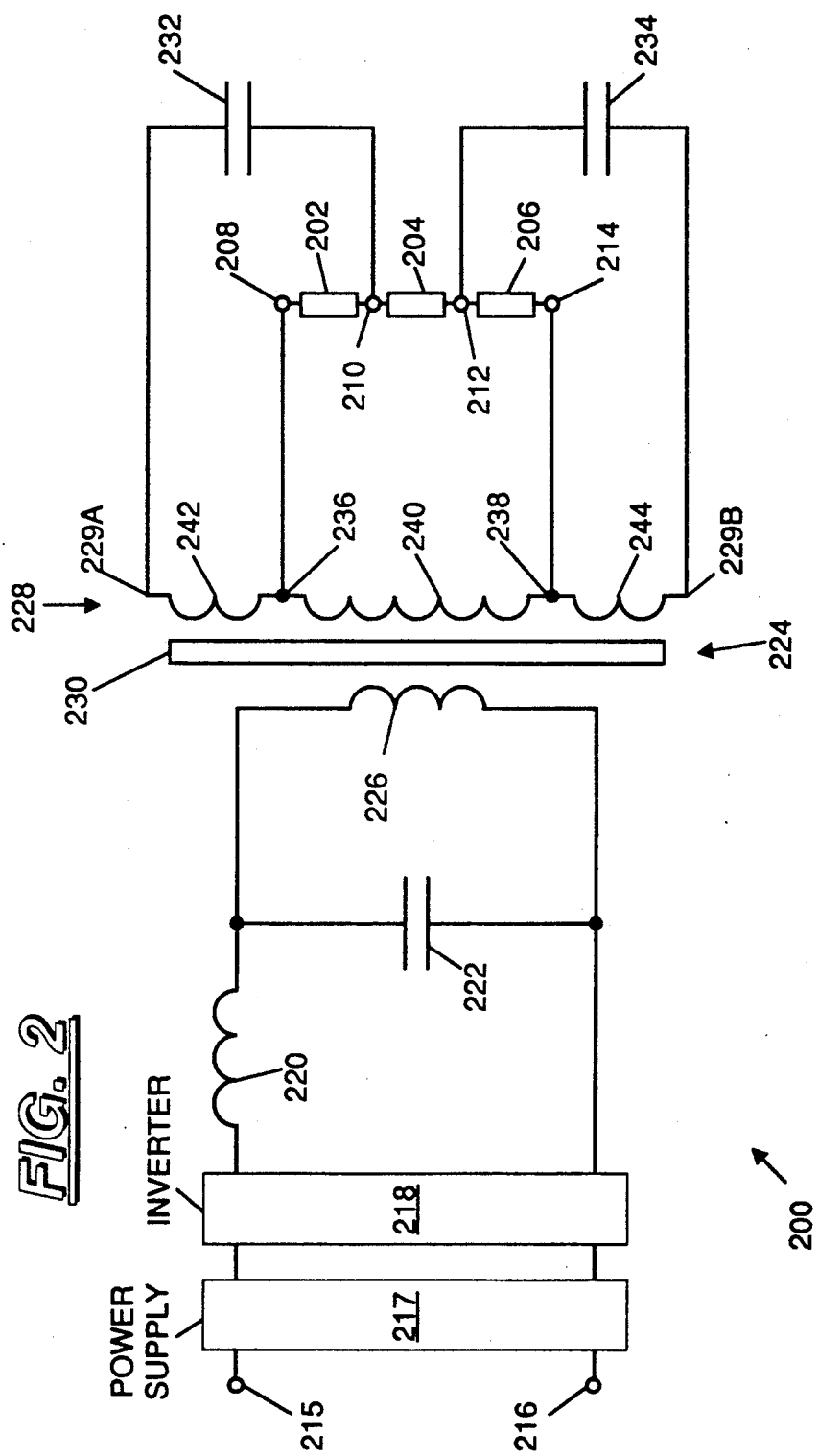

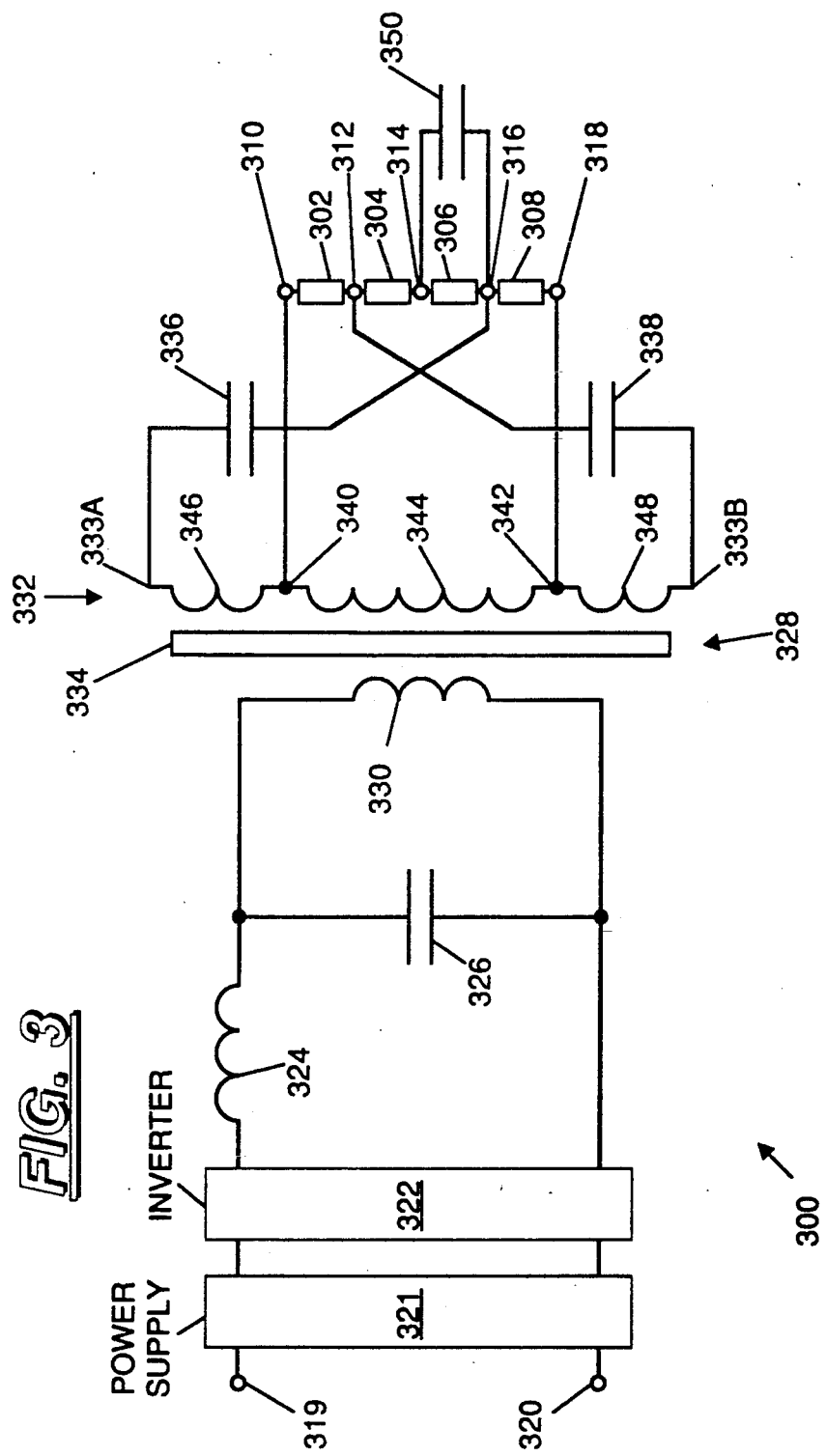

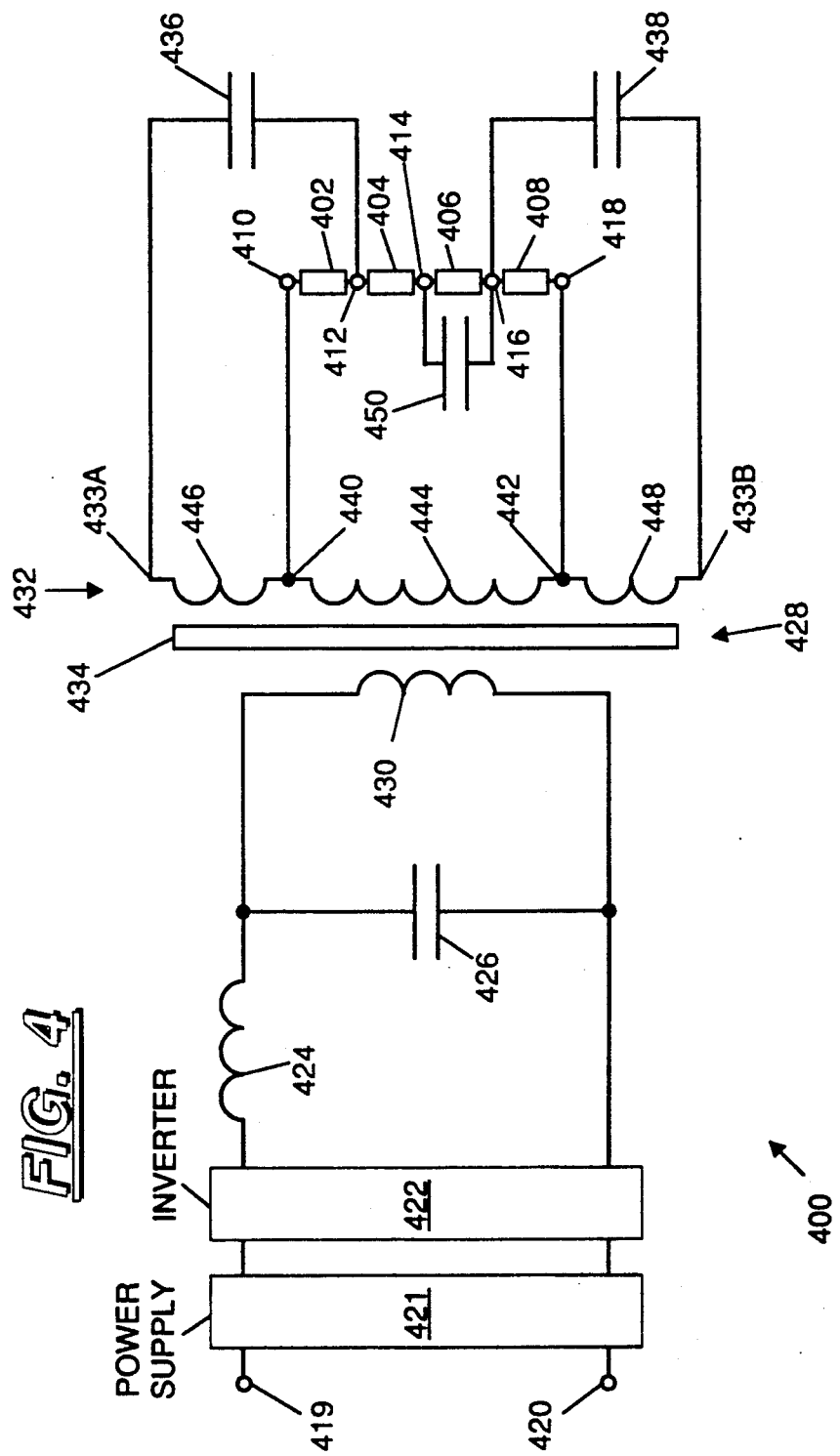

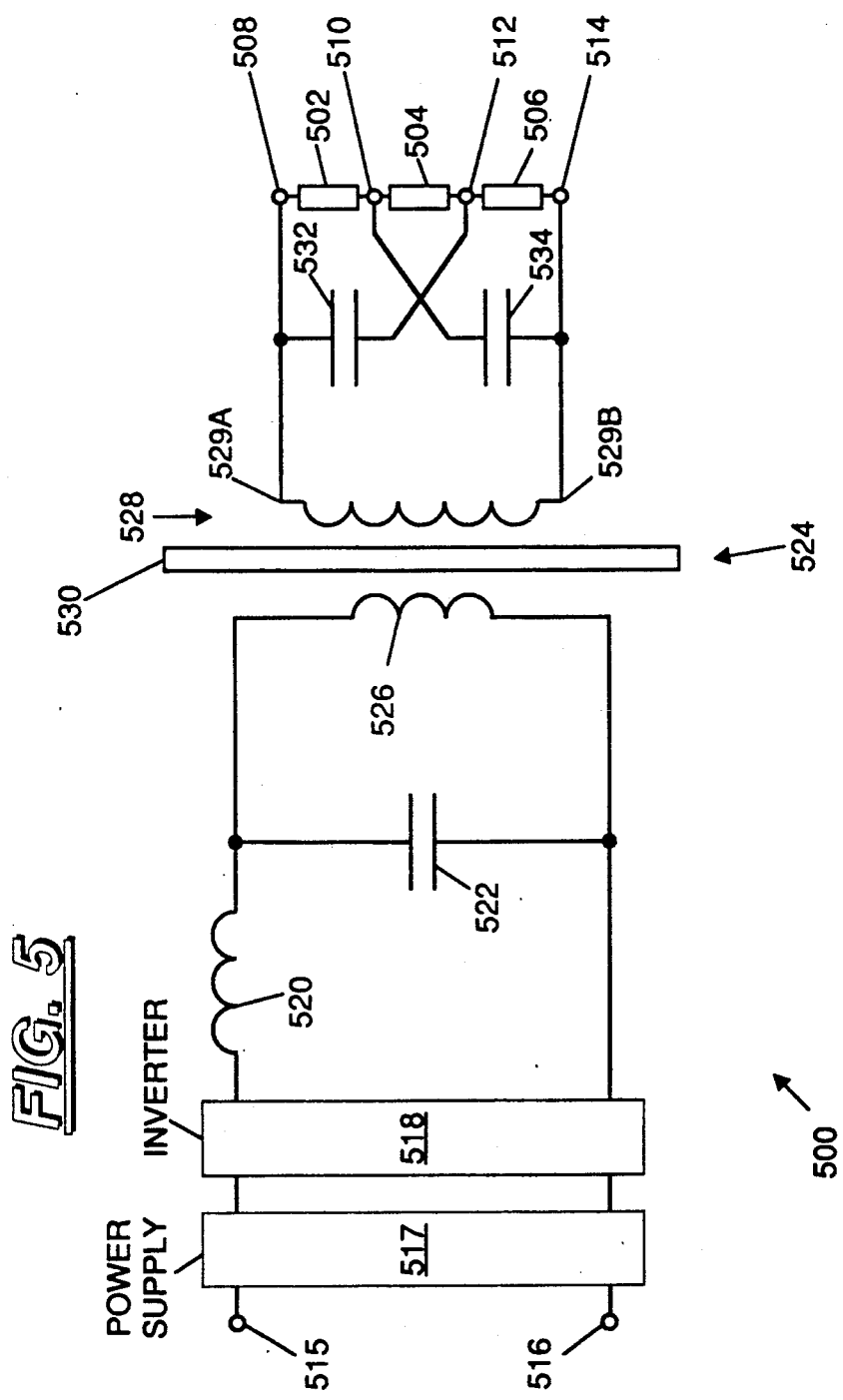

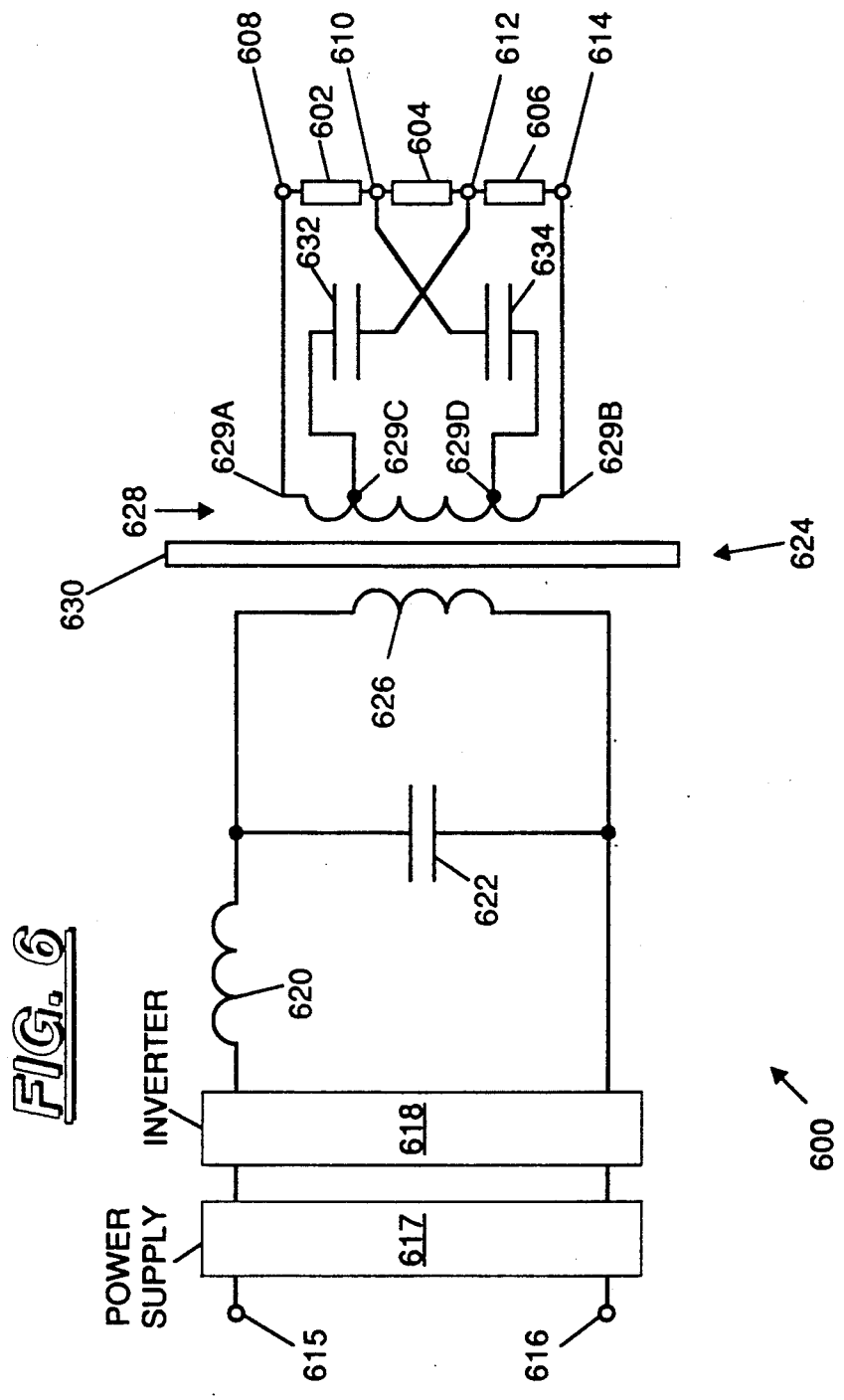

5,138,233

DRIVER CIRCUIT FOR A PLURALITY OF GAS DISCHARGE LAMPS

CROSS-REFERENCE TO RELATED APPLICATION

This application is a continuation-in-part from an earlier U.S. patent application assigned to the same assignee as the present application and having Ser. No. 07/665,829 and filing date Mar. 7, 1991, now abandoned.

BACKGROUND OF THE INVENTION

This invention relates to driver circuits for a plurality of gas discharge lamps.

In a typical prior art driver circuit for a plurality of gas discharge lamps the lamps are driven in series directly by a voltage developed across the secondary winding of a transformer. The voltage developed across the transformer secondary winding must be high enough to cause all of the lamps to strike when the circuit is powered on. However, setting the voltage developed across the transformer secondary winding at an otherwise desirable high level may contravene safety requirements and may increase operating stress on the circuit's switching components to an unacceptable degree.

It is known to connect to the lamps capacitors which act as starting aids, in order to increase the pre-strike voltage applied to the lamps. However, for driving three or more series-connected lamps, such capacitor starting aid configurations may still have to generate secondary winding voltages which are close to or exceed safety limits.

SUMMARY OF THE INVENTION

In accordance with a first aspect of the invention there is provided a circuit for driving a plurality of gas discharge lamps, the circuit comprising:
  input terminals for connection to a source of voltage supply;
  first and second output terminals for connection across a plurality of gas discharge lamps in series;
  oscillator means coupled to the input terminals for producing a high-frequency voltage;
  a transformer having a primary winding coupled to the oscillator means to receive the high-frequency voltage and having a secondary winding coupled to the output terminals,
  the improvement comprising:
    a third output terminal for connection to the lamps intermediate the first and second output terminals,
    the secondary winding of the transformer having thereon first and second points and a third point intermediate the first and second points,
    the first and third points on the secondary winding of the transformer being coupled respectively to the first and second output terminals, and
    first capacitance means coupling the second point on the secondary winding of the transformer to the third output terminal.

The voltage produced by the portion of the secondary winding between the first and third points thus drives the lamps in series, while the pre-strike voltage produced across the whole of the secondary winding between the first and second points is applied between the first and third output terminals to aid striking of the lamp or lamps connected therebetween. After striking, current to the third output terminal is limited by the first capacitance means. In this way, the voltage which needs to be produced across the whole of the secondary winding to ensure striking of all of the lamps may be reduced.

In accordance with other aspects of the invention output terminals for connection to the lamps intermediate the first and second output terminals are coupled via respective capacitance means to points on the secondary winding of the transformer which are at or between the first and second points.

In accordance with a third aspect of the invention there is provided a circuit for driving a plurality of gas discharge lamps, the circuit comprising:
  input terminals for connection to a source of voltage supply;
  first and second output terminals for connection across a plurality of gas discharge lamps in series;
  oscillator means coupled to the input terminals for producing a high-frequency voltage;
  a transformer having a primary winding coupled to the oscillator means to receive the high-frequency voltage and having a secondary winding coupled to the output terminals,
  the improvement comprising:
    a third output terminal for connection to the lamps intermediate the first and second output terminals,
    the secondary winding of the transformer having thereon first and second points coupled respectively to the first and second output terminals and having a third point thereon adjacent the first point and intermediate the first and second points, and
    first capacitance means coupling the third point on the secondary winding of the transformer to the third output terminal, so as to increase pre-strike voltage between the second and third output terminals.

The voltage produced by the secondary winding between the first and second points thus drives the lamps in series. Before striking, the pre-strike voltage produced across the secondary winding between the second and third points is applied between the second and third output terminals to aid striking of the lamp or lamps connected therebetween. After striking, current to the third output terminal is limited by the first capacitance means. In this way, the voltage which needs to be produced across the secondary winding to ensure striking, of all of the lamps may be reduced.

BRIEF DESCRIPTION OF THE DRAWINGS

Six fluorescent lamp driver circuits in accordance with the present invention will now be described, by way of example only, with reference to the accompanying drawings, in which:

FIG. 1 shows a schematic circuit diagram of a first driver circuit for driving three fluorescent lamps;

FIG. 2 shows a schematic circuit diagram of a second driver circuit for driving three fluorescent lamps;

FIG. 3 shows a schematic circuit diagram of a third driver circuit for driving four fluorescent lamps;

FIG. 4 shows a schematic circuit diagram of a fourth driver circuit for driving four fluorescent lamps;

FIG. 5 shows a schematic circuit diagram of a fifth driver circuit for driving three fluorescent lamps; and FIG. 6 shows a schematic circuit diagram of a sixth driver circuit for driving three fluorescent lamps.

DESCRIPTION OF THE PREFERRED EMBODIMENT

Referring now to FIG. 1, a first driver circuit 100 for driving three fluorescent lamps 102, 104 and 106 includes output terminals 108, 110, 112 and 114 between which the lamps are connected in series. The circuit 100 has input terminals 115, 116 for connection to a 120 VAC, 60 Hz utility mains. The input terminals are coupled through a conventional power supply section 117 and a conventional inverter section 118 to a series-resonant tank circuit formed by an inductor 120 (having a value of approximately 1.6 mH) and a capacitor 122 (having a value of approximately 4.7µF) connected in series.

A transformer 124 has a primary winding 126, connected in parallel with the capacitor 122, and a secondary winding 128. The primary and secondary windings 126 and 128 are wound on a core 130 in a total turns ratio of approximately 1:1.9, the primary winding 126 having approximately 120 turns and the secondary winding 128 having approximately 230 turns in total. The ends 129A, 129B of the secondary winding 128 are connected via respective capacitors 132, 134 (each having a value of approximately 200 pF) to the two innermost output terminals 112 and 110 respectively. The secondary winding 128 is tapped at two intermediate points 136 and 138 to form a central secondary winding portion 140 having approximately 170 turns and two extremity winding portions 142 and 144 each having approximately 30 turns. The intermediate tapping points 136 and 138 are connected respectively to the two outermost output terminals 108 and 114. A starting aid capacitor 146 (having a value of approximately 100 pF) is connected between the two innermost output terminals 110 and 112.

For simplicity of illustration, lamp filament heater windings, which would typically be provided from the same transformer 124 in conventional manner, are not shown.

In use of the driver circuit 100, alternating mains voltage (e.g. 120 VAC, 60 Hz) is applied across the input terminals 115, 116. The inductor 120 and the capacitor 122 form an LC series-resonant circuit which, energized by the applied mains voltage via the power supply 117 and the inverter 118, resonates at a nominal loaded frequency of approximately 40 KHz. The high-frequency voltage produced by the resonant circuit appears across the primary winding 126 of the transformer 124. The high-frequency voltage produced by the resonant circuit is conveyed by the transformer 124 and produces a high-frequency voltage in the secondary winding 128. The high-frequency voltage produced in the secondary winding 128 is applied to the output terminals 108, 110, 112, 114, and so across the series-connected lamps 102, 104, 106, in the following way.

Compared with a conventional lamp connection arrangement in which the three lamps would be simply connected in series across the whole of the secondary winding and would each experience the same pre-struck voltage equal to one third of the total voltage produced across the secondary winding, in the circuit 100 the lamps experience greatly increased pre-struck voltages, as follows. The voltage produced across the combination of the central portion 140 and the upper extremity portion 142 of the secondary winding 128 is applied, via the capacitor 132, across the single lamp 106. Similarly, a voltage of the same value, that produced across the combination of the central portion 140 and the lower extremity portion 144 of the secondary winding 128, is applied, via the capacitor 134, solely across the single lamp 102. The voltage produced across the whole of the secondary winding 128 (i.e. the central portion 140 and both of the extremity portions 142 and 144) is applied across a capacitive divider formed by the capacitors 132, 134 and 146 which are connected in series. Since the impedance of the capacitor 146 is approximately half of the total impedance of the capacitive divider, the voltage which is produced across the capacitor 146 and which is applied across the lamp 104, is approximately half of the voltage produced across the whole of the secondary winding.

Hence compared with a conventional lamp connection arrangement in which the three lamps would be simply connected in series across the whole of the secondary winding and would each experience the same pre-struck voltage equal to one third of the total voltage produced across the secondary winding, in the circuit 100 the lamps 102 and 106 experience a pre-struck voltage which is approximately 2.6 times as high and the lamp 104 experiences a voltage which is 1.5 times as high.

Thus, the lamps 102 and 106, having significantly higher voltages applied to them than the lamp 104, strike first. Once the lamps 102 and 106 have struck, the impedances provided by the capacitors 132 and 134 allow only an insignificantly small amount of current to flow in the extremity windings 142 and 144, and so cause the three lamps 102, 104 and 106 to be driven in series substantially entirely from the central portion 140 of the secondary winding 128. Thus, since the lamps 102 and 106 are struck and present a low voltage drop thereacross, substantially the whole of the voltage produced in the central portion 140 of the secondary winding 128 is applied across the remaining unstruck lamp 104 and causes the lamp to strike. Once the lamp 104 has struck its impedance is far less than that of the capacitor 146, and so the capacitor carries only an insignificantly small amount of current.

Thus, with all of the lamps 102, 104 and 106 struck, the impedances of the capacitors 132, 134 and 146 are far greater than those of the lamps, and so the capacitors have no significant effect on the steady-state function of the circuit, allowing the three lamps 102, 104 and 106 to be driven in series substantially entirely from the central portion 140 of the secondary winding 128.

Thus, it will be appreciated that the circuit 100 allows the lamps to be driven with pre-struck voltages greatly exceeding those in a conventional arrangement without producing a significantly greater total secondary winding voltage.

Referring now to FIG. 2, a second driver circuit 200 for driving three fluorescent lamps 202, 204 and 206 includes output terminals 208, 210, 212 and 214 between which the lamps are connected in series. The circuit 200 has input terminals 215, 216 for connection to a 120 VAC, 60 Hz utility mains. The input terminals are coupled through a conventional power supply section 217 and a conventional inverter section 218 to a series-resonant tank circuit formed by an inductor 220 (having a value of approximately 1.6 mH) and a capacitor 222 (having a value of approximately 4.7 µF) connected in series.

A transformer 224 has a primary winding 226, connected in parallel with the capacitor 222, and a secondary winding 228. The primary and secondary windings 226 and 228 are wound on a core 230 in a total turns ratio of approximately 1:1.9, the primary winding 226 having approximately 220 turns and the secondary winding 228 having approximately 230 turns in total. The ends 229A, 229B of the secondary winding 228 are connected via respective capacitors 232, 234 (each having a value of approximately 200 pF) to the two innermost output terminals 210 and 212 respectively. The secondary winding 228 is tapped at two intermediate points 236 and 238 to form a central secondary winding portion 240 having approximately 170 turns and two extremity winding portions 242 and 244 each having approximately 30 turns. The intermediate tapping points 236 and 238 are connected respectively to the two outermost output terminals 208 and 214.

For simplicity of illustration, lamp filament heater windings, which would typically be provided from the same transformer 224 in conventional manner, are not shown.

In use of the driver circuit 200, alternating mains voltage (e.g. 120 VAC, 60 Hz) is applied across the input terminals 215, 216. The inductor 220 and the capacitor 222 form an LC series-resonant circuit which, energized by the applied mains voltage via the power supply 217 and the inverter 218, resonates at a nominal loaded frequency of approximately 40 KHz. The high-frequency voltage produced by the resonant circuit appears across the primary winding 226 of the transformer 224. The high-frequency voltage produced by the resonant circuit is conveyed by the transformer 224 and produces a high-frequency voltage in the secondary winding 228. The high-frequency voltage produced in the secondary winding 228 is applied to the output terminals 208, 210, 212, 214, and so across the series-connected lamps 202, 204, 206, in the following way.

Compared with a conventional lamp connection arrangement in which the three lamps would be simply connected in series across the whole of the secondary winding and would each experience the same pre-struck voltage equal to one third of the total voltage produced across the secondary winding, in the circuit 200 an increased pre-struck voltage is produced, as follows. The voltage produced across the whole of the secondary winding 228 (i.e. the central portion 240 and both of the extremity portions 242 and 244) is applied across the single lamp 204. The voltage produced across the upper extremity winding 242 is applied across the single lamp 202, and the voltage produced across the lower extremity winding 244 is applied across the single lamp 206.

Hence compared with a conventional lamp connection arrangement in which the three lamps would be simply connected in series across the whole of the secondary winding and would each experience the same pre-struck voltage equal to one third of the total voltage produced across the secondary winding, in the circuit 200 the lamps 202 and 206 initially experience a lower voltage while the lamp 204 experiences a voltage which is 3 times as high. This causes the lamp 204 to strike rapidly and first. Once the lamp 204 has struck the impedances provided by the capacitors 232 and 234 allow only an insignificantly small amount of current to flow in the extremity windings 242 and 244, and so cause the three lamps 202, 204 and 206 to be driven in series substantially entirely from the central portion 240 of the secondary winding 228. In this condition, with the lamp 204 struck and presenting very little voltage drop thereacross compared with the unstruck lamps 202 and 206, the voltage produced by the central portion 240 of the secondary winding 228 is applied across the three series-connected lamps and results in each of the lamps 202 and 206 experiencing approximately half of this voltage. This causes the lamps 202 and 206 to strike rapidly, and all three lamps are then driven in series from the central portion 240 of the secondary winding 228.

Thus, it will be appreciated that the circuit 200 allows the lamps to be struck with pre-struck voltages greater than in a conventional arrangement, without producing a significantly greater total secondary winding voltage.

Referring now to FIG. 3, a third driver circuit 300 for driving four fluorescent lamps 302, 304, 306 and 308 includes output terminals 310, 312, 314, 316 and 318 between which the lamps are connected in series. The circuit 300 has input terminals 319, 320 for connection to a 120 VAC, 60 Hz utility mains. The input terminals are coupled through a conventional power supply section 321 and a conventional inverter section 322 to a series-resonant tank circuit formed by an inductor 324 (having a value of approximately 1.6 mH) and a capacitor 326 (having a value of approximately 4.7 μF) connected in series.

A transformer 328 has a primary winding 330, connected in parallel with the capacitor 326, and a secondary winding 332. The primary and secondary windings 330 and 332 are wound on a core 334 in a total turns ratio of approximately 1:1.9, the primary winding 330 having approximately 120 turns and the secondary winding 332 having approximately 230 turns in total. The ends 333A, 333B of the secondary winding 332 are connected via respective capacitors 336, 338 (each having a value of approximately 200 pF) to the inner output terminals 316 and 312 respectively. The secondary winding 332 is tapped at two intermediate points 340 and 342 to form a central secondary winding portion 344 having approximately 170 turns and two extremity winding portions 346 and 348 each having approximately 30 turns. The intermediate tapping points 340 and 342 are connected respectively to the two outermost output terminals 310 and 318. A starting aid capacitor 350 (having a value of approximately 100 pF) is connected between the innermost output terminal 314 and the inner output terminal 316.

For simplicity of illustration, lamp filament heater windings, which would typically be provided from the same transformer 328 in conventional manner, are not shown.

In use of the driver circuit 300, alternating mains voltage (e.g. 120 VAC, 60 Hz) is applied across the input terminals 319, 320. The inductor 324 and the capacitor 326 form an LC series-resonant circuit which, energized by the applied mains voltage via the power supply 321 and the inverter 322, resonates at a nominal loaded frequency of approximately 40 KHz. The high-frequency voltage produced by the resonant circuit appears across the primary winding 330 of the transformer 328. The high-frequency voltage produced by the resonant circuit is conveyed by the transformer 328 and produces a high-frequency voltage in the secondary winding 332. The high-frequency voltage produced in the secondary winding 332 is applied to the output terminals 310, 312, 314, 316, 318 and so across the series-connected lamps 302, 304, 306, 308 in the following way.

Compared with a conventional lamp connection arrangement in which the four lamps would be simply connected in series across the whole of the secondary winding and would each experience the same pre-struck voltage equal to one quarter of the total voltage produced across the secondary winding, in the circuit 300 the lamps experience greatly increased pre-struck voltages, as follows. The voltage produced across the combination of the central portion 344 and the upper extremity portion 346 of the secondary winding 332 is applied, via the capacitor 336, across the single lamp 308. Similarly, a voltage of the same value, that produced across the combination of the central portion 344 and the lower extremity portion 348 of the secondary winding 332, is applied, via the capacitor 338, solely across the single lamp 302. The voltage produced across the whole of the secondary winding 332 (i.e. the central portion 344 and both of the extremity portions 346 and 348) is applied via the capacitors 336, 338 and 350 to appear substantially across the inner lamp 304. Since the other inner lamp 306 has the capacitor 350 connected in parallel with it, the voltage produced across the lamp is significantly smaller than that produced across the lamp 304.

Hence compared with a conventional lamp connection arrangement in which the four lamps would be simply connected in series across the whole of the secondary winding and would each experience the same pre-struck voltage equal to one quarter of the total voltage produced across the secondary winding, in the circuit 300 the lamps 302 and 308 experience a pre-struck voltage which is approximately 3.5 times as high and the lamps 304 experiences a voltage which is approximately 4 times as high. Thus, the inner lamp 304 is caused to strike rapidly and first. Once the lamp 304 has struck, the voltage across the lamp drops substantially and the circuit becomes equivalent to the circuit 100 of FIG. 1 which has already been discussed. Thus, once the lamp 304 has struck, the outer lamps 302 and 308 next strike rapidly. Once the lamps 304, 302 and 308 have struck, the impedances provided by the capacitors 336 and 338 allow only an insignificantly small amount of current to flow in the extremity windings 346 and 348, and so cause all four lamps 302, 304, 306 and 308 to be driven in series substantially entirely from the central portion 344 of the secondary winding 332. Thus, since the lamps 302, 304 and 308 are struck and present a low voltage drop thereacross, substantially the whole of the voltage produced in the central portion 344 of the secondary winding 332 is applied across the remaining unstruck lamp 306 and causes the lamp to strike. Once the lamp 306 has struck its impedance is far less than that of the capacitor 350, and so the capacitor carries only an insignificantly small amount of current.

Thus, with all of the lamps 302, 304, 306 and 308 struck, the impedances of the capacitors 336, 338 and 350 are far greater than those of the lamps, and so the capacitors have no significant effect on the steady-state function of the circuit, allowing the four lamps 302, 304, 306 and 308 to be driven in series substantially entirely from the central portion 344 of the secondary winding 332.

Thus, it will be appreciated that the circuit 300 allows the lamps to be driven with pre-struck voltages of approximately 4 and 3.5 times as great as in a conventional arrangement without producing a significantly greater total secondary winding voltage.

Referring now to FIG. 4, a fourth driver circuit 400 for driving four fluorescent lamps 402, 404, 406 and 308 includes output terminals 410, 412, 414, 416 and 418 between which the lamps are connected in series. The circuit 400 has input terminals 419, 420 for connection to a 120 VAC, 60 Hz utility mains. The input terminals are coupled through a conventional power supply section 421 and a conventional inverter section 422 to a series-resonant tank circuit formed by an inductor 424 (having a value of approximately 1.6 mH) and a capacitor 426 (having a value of approximately 4.7 $\mu$F) connected in series.

A transformer 428 has a primary winding 430, connected in parallel with the capacitor 426, and a secondary winding 432. The primary and secondary windings 430 and 432 are wound on a core 434 in a total turns ratio of approximately 1:1.9, the primary winding 430 having approximately 120 turns and the secondary winding 432 having approximately 230 turns in total. The ends 433A, 433B of the secondary winding 432 are connected via respective capacitors 436, 438 (each having a value of approximately 200 pF) to the inner output terminals 412 and 416 respectively. The secondary winding 432 is tapped at two intermediate points 440 and 442 to form a central secondary winding portion 444 having approximately 170 turns and two extremity winding portions 446 and 448 each having approximately 30 turns. The intermediate tapping points 440 and 442 are connected respectively to the two outermost output terminals 410 and 418. A starting aid capacitor 450 (having a value of approximately 100 pF) is connected between the innermost output terminal 414 and the inner output terminal 416.

For simplicity of illustration, lamp filament heater windings, which would typically be provided from the same transformer 428 in conventional manner, are not shown.

In use of the driver circuit 400, alternating mains voltage (e.g. 120 VAC, 60 Hz) is applied across the input terminals 419, 420. The inductor 424 and the capacitor 426 form an LC series-resonant circuit which, energized by the applied mains voltage via the power supply 421 and the inverter 422, resonates at a nominal loaded frequency of approximately 40 KHz. The high-frequency voltage produced by the resonant circuit appears across the primary winding 430 of the transformer 428. The high-frequency voltage produced by the resonant circuit is conveyed by the transformer 428 and produces a high-frequency voltage in the secondary winding 432. The high-frequency voltage produced in the secondary winding 432 is applied to the output terminals 410, 412, 414, 416, 418 and so across the series-connected lamps 402, 404, 406, 408 in the following way.

Compared with a conventional lamp connection arrangement in which the four lamps would be simply connected in series across the whole of the secondary winding and would each experience the same pre-struck voltage equal to one quarter of the total voltage produced across the secondary winding, in the circuit 400 an increased pre-struck voltage is produced, as follows. The voltage produced across the upper extremity winding 446 is applied across the single lamp 402, and the voltage produced across the lower extremity winding 448 is applied across the single lamp 408. The voltage produced across the whole of the secondary winding 432 (i.e. the central portion 444 and both of the extremity portions 446 and 448) is applied, via the capacitors 436 and 438, across the two innermost lamps 404 and 406 connected in series; since the capacitor 450 is connected in parallel with the lamp 406, very little of this voltage appears across the lamp 406 and substantially the whole of this voltage appears across the lamp 404.

Hence compared with a conventional lamp connection arrangement in which the four lamps would be simply connected in series across the whole of the secondary winding and would each experience the same pre-struck voltage equal to one quarter of the total voltage produced across the secondary winding, in the circuit 400 the lamps 402, 406 and 408 initially experience lower voltages while the lamp 404 experiences a voltage which is approximately 4 times as high. This causes the lamp 404 to strike rapidly and first. Once the lamp 404 has struck, the lamp 406 strikes next; once the lamp 406 has struck its impedance is far less than that of the capacitor 450, and so the capacitor carries only an insignificantly small amount of current. Once the lamps 404 and 406 have struck, the impedances provided by the capacitors 436 and 438 allow only an insignificantly small amount of current to flow in the extremity windings 446 and 448, and so cause the four lamps 402, 404, 406 and 408 to be driven in series substantially entirely from the central portion 444 of the secondary winding 432. In this condition, with the lamps 404 and 406 struck and presenting very little voltage drop thereacross compared with the unstruck lamps 402 and 408, the voltage produced by the central portion 444 of the secondary winding 432 is applied across the four series-connected lamps and results in each of the lamps 404 and 406 experiencing approximately half of this voltage. This causes the lamps 404 and 406 to strike rapidly, and all four lamps are then driven in series from the central portion 444 of the secondary winding 432.

Thus, it will be appreciated that the circuit 400 allows the lamps to be struck sequentially with pre-struck voltages twice as great as in a conventional arrangement, without increasing voltage levels at other points within the circuit or without producing a significantly greater total secondary winding voltage.

It will be understood that by decreasing the impedance of the capacitor 450 with respect to the impedances of the capacitors 436 and 438, the lamp 406 could be made to strike before the outer lamps 402 and 408, if desired.

Referring now to FIG. 5, a fifth driver circuit 500 for driving three fluorescent lamps 502, 504 and 506 includes output terminals 508, 510, 512 and 514 between which the lamps are connected in series. The circuit 500 has input terminals 515, 516 for connection to a 120 VAC, 60 Hz utility mains. The input terminals are coupled through a conventional power supply section 517 and a conventional inverter section 518 to a series-resonant tank circuit formed by an inductor 520 (having a value of approximately 1.6 mH) and a capacitor 522 (having a value of approximately 4.7 μF) connected in series.

A transformer 524 has a primary winding 526, connected in parallel with the capacitor 522, and a secondary winding 528. The primary and secondary windings 526 and 528 are wound on a core 530 in a total turns ratio of approximately 1:1.9, the primary winding 526 having approximately 120 turns and the secondary winding 528 having approximately 230 turns in total. The ends 529A, 529B of the secondary winding 528 are connected respectively to the two outermost output terminals 508 and 514. The ends 529A, 529B of the secondary winding 528 are also connected via respective capacitors 532, 534 (each having a value of approximately 200 pF) to the two innermost output terminals 512 and 510 respectively.

For simplicity of illustration, lamp filament heater windings, which would typically be provided from the same transformer 524 in conventional manner, are not shown.

It will be understood that the driver circuit 500 of FIG. 5 represents a simplified version of the driver circuit 100 described above, in which the lengths of the extremity portions 142 and 144 are reduced to zero, the outermost output terminals 108 and 114 are connected directly to the ends 129A and 129B of the secondary winding 128, and the starting aid capacitor 146 is removed. It will be appreciated that the driver circuit 500 of FIG. 5 operates similarly to the driver circuit 100 as follows.

In use of the driver circuit 500, alternating mains voltage (e.g. 120 VAC, 60 Hz) is applied across the input terminals 515, 516. The inductor 520 and the capacitor 522 form an LC series-resonant circuit which, energized by the applied mains voltage via the power supply 517 and the inverter 518, resonates at a nominal loaded frequency of approximately 40 KHz. The high-frequency voltage produced by the resonant circuit appears across the primary winding 526 of the transformer 524. The high-frequency voltage produced by the resonant circuit is conveyed by the transformer 524 and produces a high-frequency voltage in the secondary winding 528. The high-frequency voltage produced in the secondary winding 528 is applied to the output terminals 508, 510, 512, 414, and so across the series-connected lamps 502, 504, 506, in the following way.

Compared with a conventional lamp connection arrangement in which the three lamps would be simply connected in series between the ends of the secondary winding and would each experience the same pre-struck voltage equal to one third of the total voltage produced across the secondary winding, in the circuit 500 the lamps experience greatly increased pre-struck voltages, as follows. The voltage produced across the secondary winding 528 between its ends 529A and 529B is applied, via the capacitor 532, across the single lamp 506. Similarly, the same voltage developed across the secondary winding 528 between its ends 529 and 529B is applied, via the capacitor 534, across the single lamp 502. Also, the same voltage developed across the secondary winding 528 between its ends 529A and 529B is applied, via the capacitor 532 and 534, across the single lamp 504.

Hence compared with a conventional lamp connection arrangement in which the three lamps would be simply connected in series across the whole of the secondary winding and would each experience the same pre-struck voltage equal to one third of the total voltage produced across the secondary winding, in the circuit 100 the lamps 102, 104 and 106 each experience a pre-struck voltage which is approximately 3 times as high.

In fact it will be understood that the voltages produced at the two innermost output terminals 510 and 512 are of slightly less magnitude than the voltages produced at the ends 529B and 529A respectively of the secondary winding 528 due to the presence of the capacitors 132 and 134, causing the voltage produced across the lamp 504 to be slightly less than the voltages produced across the lamps 502 and 504.

Thus, the lamps 502 and 506, having higher voltages applied to them than the lamp 504, strike first. Once the lamps 502 and 506 have struck, the impedances provided by the capacitors 532 and 534 allow only an insignificantly small amount of current to flow between the ends 529A, 529B of the secondary winding 528 and the two innermost output terminals 512 and 510 respectively, and so cause the three lamps 502, 504 and 506 to be driven in series from the voltage produced between the ends 529A and 529B of the secondary winding 528. Thus, since the lamps 502 and 506 are struck and present a low voltage drop thereacross, substantially the whole of the voltage produced in the secondary winding 528 is applied across the remaining unstruck lamp 504 and causes the lamp to strike.

Thus, it will be appreciated that the circuit 500 allows the lamps to be driven with pre-struck voltages greatly exceeding those in a conventional arrangement without producing a significantly greater total secondary winding voltage.

It will be understood that it is not necessary for the capacitors 532 and 534 to be connected to precisely the ends 529A and 529B respectively of the secondary winding 528 in order to increase the pre-strike voltage across the fluorescent lamps 502, 504 and 506. For example, it will be appreciated that the capacitors 532 and 534 may be connected to points on the secondary winding 528 which are adjacent to the ends 529A and 529B, producing a lower (but still beneficial) increase in pre-strike voltage across the lamps.

Such an arrangement is employed in the driver circuit shown in FIG. 6, which is identical to the driver circuit of FIG. 5 except in only one respect: instead of capacitors being connected directly between the innermost output terminals and the ends of the secondary winding as in FIG. 5, the capacitors 632 and 634 are instead connected directly between innermost output terminals 612 and 610 and tapping points 629C and 629D which are adjacent to ends 629A and 629B respectively of secondary winding 628. In all other respects the driver circuit of FIG. 6 is identical with the circuit of FIG. 5 and operates in a similar manner as described above, and so will not be described in further detail. It will be understood that the greater the distances along the secondary winding between the point 629C and the end 629A and between the point 629D and the end 629B, the less will be the increased pre-strike voltage effect compared with that produced in the circuit of FIG. 5 discussed above.

It will be understood that (similarly to viewing the driver circuit 500 of FIG. 5 as a simplified version of the driver circuit 100 of FIG. 1 in which the secondary winding extremity portions 142 and 144 have zero lengths, as discussed above) the driver circuit 600 of FIG. 6 may be considered an analogous version of the driver circuit 100, in which the extremity portions 142 and 144 have negative lengths (i.e., they extend into, rather than out from, the central core portion 140).

Thus, comparing the driver circuit of FIG. 6 with that of FIG. 5, it will be understood that by connecting capacitors between intermediate points along the series connected lamps and points on the secondary winding which are closer together than the points on the secondary winding between which the lamps are connected in series, the pre-strike voltage experienced by the lamps is decreased (although the coupling of the capacitors in both of these circuits still produces an increase in pre-strike voltage). It will also be understood, comparing the driver circuit of FIG. 1 with that of FIG. 5, that by connecting capacitors between intermediate points along the series connected lamps and points on the secondary winding which are farther apart than the points on the secondary winding between which the lamps are connected in series, the pre-strike voltage experienced by the lamps is increased (although the coupling of the capacitors in both of these circuits still produces an increase in pre-strike voltage).

Thus, it will be appreciated that the points on the secondary winding at which capacitors are connected to enhance the pre-strike voltage may be either: (i) at the points on the secondary winding between which the lamps are connected in series (as in FIG. 5), or (ii) adjacent to the points on the secondary winding between which the lamps are connected in series (as in FIGS. 1-4 and FIG. 6), and that in the second case the points on the secondary winding at which the capacitors are connected may be either between (as in FIG. 6) or outside of (as in FIGS. 1-4) the points on the secondary winding between which the lamps are connected in series to produce an enhanced pre-strike voltage effect.

It will be appreciated that although in FIG. 1, FIG. 2, FIG. 5 and FIG. 6 there have been described circuits for driving three lamps, and in FIG. 3 and FIG. 4 there have been described circuits for driving four lamps, the invention is not restricted to the driving of three or four lamps. It will be understood that the invention is also applicable to circuits for driving two lamps or for driving five or more lamps.

It will be appreciated that various other modifications or alternatives to the above described embodiments will be apparent to a person skilled in the art without departing from the inventive concept of driving a plurality of gas discharge lamps in series from a transformer secondary winding and providing a capacitance which couples an intermediate junction of the series-connected lamps to an end of the secondary winding or to a point adjacent thereto so as to increase the pre-struck voltage applied to one or more of the lamps.

We claim:

1. A circuit for driving a plurality of gas discharge lamps, the circuit comprising:
   input terminals for connection to a source of voltage supply;
   first and second output terminals for connection across a plurality of gas discharge lamps in series;
   oscillator means coupled to the input terminals for producing a high-frequency voltage;
   a transformer having a primary winding coupled to the oscillator means to receive the high-frequency voltage and having a secondary winding coupled to the output terminals,
   the improvement comprising:
   a third output terminal for connection to the lamps intermediate the first and second output terminals,
   the secondary winding of the transformer having thereon first and second points and a third point intermediate the first and second points,
   the first and third points on the secondary winding of the transformer being coupled respectively to the first and second output terminals, and
   first capacitance means coupling the second point on the secondary winding of the transformer to the third output terminal.

2. A circuit according to claim 1 for driving at least three lamps wherein
   the secondary winding of the transformer has thereon a fourth point adjacent the first point and remote from the third point, and wherein the circuit further comprises:
a fourth output terminal for connection to the lamps intermediate the second and third output terminals; and
second capacitance means coupling the fourth point on the secondary winding of the transformer to the fourth output terminal.

3. A circuit according to claim 2 further comprising parallel capacitance means coupled between the third and fourth output terminals.

4. A circuit according to claim 1 for driving at least three lamps wherein
the secondary winding of the transformer has thereon a fourth point adjacent the first point and remote from the third point,
and wherein the circuit further comprises:
a fourth output terminal for connection to the lamps intermediate the first and third output terminals; and
second capacitance means coupling the fourth point on the secondary winding of the transformer to the fourth output terminal.

5. A circuit according to claim 1 for driving at least four lamps wherein
the secondary winding of the transformer has thereon a fourth point adjacent the first point and remote from the third point,
and wherein the circuit further comprises:
a fourth output terminal for connection to the lamps intermediate the second and third output terminals;
a fifth output terminal for connection to the lamps intermediate the third and fourth output terminals; and
second capacitance means coupling the fourth point on the secondary winding of the transformer to the fourth output terminal.

6. A circuit according to claim 5 further comprising parallel capacitance means coupled between the third and fifth output terminals.

7. A circuit according to claim 1 for driving at least four lamps wherein
the secondary winding of the transformer has thereon a fourth point adjacent the first point and remote from the third point,
and wherein the circuit further comprises:
a fourth output terminal for connection to the lamps intermediate the first and third output terminals;
a fifth output terminal for connection to the lamps intermediate the third and fourth output terminals; and
second capacitance means coupling the fourth point on the secondary winding of the transformer to the fourth output terminal.

8. A circuit according to claim 7 further comprising parallel capacitance means coupled between the fourth and fifth output terminals.

9. A circuit according to claim 1 wherein the oscillator means comprises a series-resonant LC oscillator.

10. A circuit according to claim 9 wherein the oscillator means further comprises inverter means coupled between the series-resonant LC oscillator and the input terminals.

11. A circuit for driving at least three gas discharge lamps, the circuit comprising:

input terminals for connection to a source of voltage supply;
first and second output terminals for connection across the at least three gas discharge lamps in series;
series-resonant oscillator means coupled to the input terminals for producing a high-frequency voltage;
a transformer having a primary winding coupled to the oscillator means to receive the high-frequency voltage and having a secondary winding coupled to the output terminals,
a third output terminal for connection to the lamps intermediate the first and second output terminals,
a fourth output terminal for connection to the lamps intermediate the first and third output terminals,
the secondary winding of the transformer having sequentially thereon first, second, third and fourth points,
the second and third points on the secondary winding of the transformer being coupled respectively to the first and second output terminals,
first capacitance means coupling the first point on the secondary winding of the transformer to the third output terminal, and
second capacitance means coupling the fourth point on the secondary winding of the transformer to the fourth output terminal.

12. A circuit for driving at least three gas discharge lamps, the circuit comprising:
input terminals for connection to a source of voltage supply;
first and second output terminals for connection across at least three gas discharge lamps in series;
oscillator means coupled to the input terminals for producing a high-frequency voltage;
a transformer having a primary winding coupled to the oscillator means to receive the high-frequency voltage and having a secondary winding coupled to the output terminals,
the improvement comprising:
a third output terminal for connection to the lamps intermediate the first and second output terminals,
a fourth output terminal for connection to the lamps intermediate the first and second output terminals,
the secondary winding of the transformer having thereon first and second points coupled respectively to the first and second output terminals, and
first capacitance means coupling the first point on the secondary winding of the transformer to the third output terminal, and
second capacitance means coupling the second point on the secondary winding of the transformer to the fourth output terminal,
whereby pre-strike lamp voltage is increased.

13. A circuit for driving at least three gas discharge lamps, the circuit comprising:
input terminals for connection to a source of voltage supply;
first and second output terminals for connection across a plurality of gas discharge lamps in series;
oscillator means coupled to the input terminals for producing a high-frequency voltage;
a transformer having a primary wining coupled to the oscillator means to receive the high-frequency voltage and having a secondary winding coupled to the output terminals,
the improvement comprising:

a third output terminal for connection to the lamps intermediate the first and second output terminals, the secondary winding of the transformer having thereon first and second points coupled respectively to the first and second output terminals, first capacitance means coupling the first point on the secondary winding of the transformer to the third output terminal, so as to increase pre-strike voltage between the second and third output terminals, a fourth output terminal for connection to the lamps intermediate the first and third output terminals; and second capacitance means coupling the second point on the secondary winding of the transformer to the fourth output terminal, so as to increase pre-strike voltage between the first and fourth output terminals.

14. A circuit according to claim 13 wherein the oscillator means comprises a series-resonant LC oscillator.

15. A circuit according to claim 14 wherein the oscillator means further comprises inverter means coupled between the series-resonant LC oscillator and the input terminals.

16. A circuit for driving at least three gas discharge lamps, the circuit comprising:

input terminals for connection to a source of voltage supply;

first and second output terminals for connection across the at least three gas discharge lamps in series;

series-resonant oscillator means coupled to the input terminals for producing a high-frequency voltage;

a transformer having a primary winding coupled to the oscillator means to receive the high-frequency voltage and having a secondary winding coupled to the output terminals, a third output terminal for connection to the lamps intermediate the first and second output terminals, a fourth output terminal for connection to the lamps intermediate the first and third output terminals, the secondary winding of the transformer having thereon first and second points coupled respectively to the first and second output terminals, first capacitance means coupling the first point on the secondary winding of the transformer to the third output terminal, so as to increase pre-strike voltage between the second and third output terminals, and second capacitance means coupling the second point on the secondary winding of the transformer to the fourth output terminal, so as to increase pre-strike voltage between the first and fourth output terminals.

17. A circuit for driving at least three gas discharge lamps, the circuit comprising:

input terminals for connection to a source of voltage supply;

first and second output terminals for connection across at least three gas discharge lamps in series;

oscillator means coupled to the input terminals for producing a high-frequency voltage;

a transformer having a primary winding coupled to the oscillator means to receive the high-frequency voltage and having a secondary winding coupled to the output terminals, the improvement comprising:

a third output terminal for connection to the lamps intermediate the first and second output terminals, a fourth output terminal for connection to the lamps intermediate the first and second output terminals, the secondary winding of the transformer having thereon first and second points coupled respectively to the first and second output terminals and having a third point thereon adjacent the first point and intermediate the first and second points and having a third point thereon adjacent the second point and intermediate the second and third points, first capacitance means coupling the third point on the secondary winding of the transformer to the third output terminal, and second capacitance means coupling the fourth point on the secondary winding of the transformer to the fourth output terminal, whereby pre-strike lamp voltage is increased.

18. A circuit for driving at least three gas discharge lamps, the circuit comprising:

input terminals for connection to a source of voltage supply;

first and second output terminals for connection across a plurality of gas discharge lamps in series;

oscillator means coupled to the input terminals for producing a high-frequency voltage;

a transformer having a primary winding coupled to the oscillator means to receive the high-frequency voltage and having a secondary winding coupled to the output terminals, the improvement comprising:

a third output terminal for connection to the lamps intermediate the first and second output terminals, the secondary winding of the transformer having thereon first and second points coupled respectively to the first and second output terminals and having a third point thereon adjacent the first point and intermediate the first and second points, and first capacitance means coupling the third point on the secondary winding of the transformer to the third output terminal, so as to increase pre-strike voltage between the second an third output terminals, the secondary winding of the transformer having thereon a fourth point adjacent the second point and intermediate the second and third points, a fourth output terminal for connection to the lamps intermediate the first and third output terminals; and second capacitance means coupling the fourth point on the secondary winding of the transformer to the fourth output terminal, so as to increase pre-strike voltage between the first and fourth output terminals.

19. A circuit according to claim 18 wherein the oscillator means comprises a series-resonant LC oscillator.

20. A circuit for driving at least three gas discharge lamps, the circuit comprising:

input terminals for connection to a source of voltage supply;

first and second output terminals for connection across the at least three gas discharge lamps in series;

series-resonant oscillator means coupled to the input terminals for producing a high-frequency voltage;
a transformer having a primary winding coupled to the oscillator means to receive the high-frequency voltage and having a secondary winding coupled to the output terminals,
a third output terminal for connection to the lamps intermediate the first and second output terminals,
a fourth output terminal for connection to the lamps intermediate the first and third output terminals,
the secondary winding of the transformer having thereon first and second points coupled respectively to the first and second output terminals, a third point adjacent the first point and intermediate the first and second points, and a fourth point adjacent the second point and intermediate the second and third points,
firs capacitance means coupling the third point on the secondary winding of the transformer to the third output terminal, so as to increase pre-strike voltage between the second and third output terminals, and
second capacitance means coupling the fourth point on the secondary winding of the transformer to the fourth output terminal, so as to increase pre-strike voltage between the first and fourth output terminals.

* * * * *